United States Patent Office 2,958,419
Patented Nov. 1, 1960

2,958,419
STRESSED FLEXIBLE CONTAINERS

David H. Kaelble, St. Paul, and Paul I. Roth, White Bear Lake, Minn., assignors to Minnesota Mining and Manufacturing Company, St. Paul, Minn., a corporation of Delaware No Drawing. Filed July 2, 1958, Ser. No. 746,080

2 Claims. (Cl. 206—46)

This invention relates to packaging in flexible plastic containers and more particularly to a method for preventing the stress-cracking of liquid-filled, flexible, heat-sealed plastic film containers.

The use of plastic films for packaging is well known. Thin plastic films have been used for the packaging of many materials, and in particular, heat-sealable moisture-proof cellophane films and the like have been employed for the packaging of food-stuffs, drugs, chemicals, etc., as for example described in United States Patent No. 2,704,075.

While heat-sealable films of a single plastic material are useful for many purposes, they are ordinarily not of themselves suitable for packaging such things as liquids or materials which must not be exposed to the oxygen of the air. For example, polyethylene in film form, that is, no greater than about 10 mils thick, is quite readily permeated by oxygen, solvent and water vapors, vegetable oils and the like, which fact limits its acceptability for wide use in the packaging field. Films made of other polymers such as rubber hydrochloride, vinylidene chloride, vinyl chloride-vinyl acetate copolymer, cellulose acetate and the like have other disadvantages. Some of them are difficult to seal using heat-sealing machinery in the usual way, while other difficulties commonly encountered include low stability at elevated temperatures, poor static electrical properties, the necessity for including large amounts of plasticizers therein with concomitant problems respecting migration, toxicity, and staining, and the like. Consequently in an effort to provide materials which are suitable for packaging liquids and the like, laminated films composed of two or more layers having complementary properties have been produced, such as cellophane films coated with polyethylene, cellulose acetate films coated with rubber hydrochloride, polyester films such as polyethylene terephthalate coated with polyethylene and the like.

By employing such laminated films which may preferably be composed of 2 or more of the available plastic films which are adhered together, for example, by means of cements, bonding agents and the like, it has been possible heretofore to produce packages which are impermeable to liquids. Thus, motor oil, vegetable oils, liquid food-stuffs, aqueous solutions, and the like liquid and semi-liquid substances can be packaged directly in heat-sealable plastic film laminates. The form of package employed may be, for example, the ordinary rectangular pillow shape. Such packages can be prepared by heat-sealing tubing prepared from the films or envelopes or packets can be prepared by heat-sealing the edges of two face-to-face webs of the film laminates; or a single web can be folded and heat-seals made on three sides thereof. Other methods of packaging in this manner are well known and other shapes may be employed for convenience in packing or to add distinctiveness.

While, as has been stated, suitable laminated films have heretofore been available for packaging liquid substances, a serious drawback has nevertheless existed with respect to such packages after they have been filled. It has been found that when liquid-filled packages made from flexible plastic films are subjected to vibration and shaking, such as occurs during shipment, they tend to form stress-cracks. This is found to be particularly prevalent when larger packages are employed having a capacity of one to several pints or more. This stress-cracking does not appear to be associated with delamination of multi-layered film. The stress-cracks may initially affect only the surfaces of the film, but in time they penetrate through the film causing leaking of the contents of the package. However, even if the cracks do not extend through the film nevertheless after shipment or rough handling, when such cracks begin to appear, the plastic packages become wrinkled and present an unattractive appearance. The combination of the unattractive appearance of the package and the possibility of leakage tends not only to limit customer acceptance of products thus packaged but also the adoption of this very convenient method of packaging.

It is an object of this invention to provide a means for preventing the stress-cracking of liquid-filled, flexible, plastic film containers. It is another object of this invention to provide a liquid-filled, flexible, sealed plastic film container which can be subjected to rough handling and shipment over long distances without the appearance of stress-cracking in the plastic film. Other objects of the invention will become apparent from the disclosure hereinafter made.

In accordance with the above and other objects of the invention, it has been found that stress-cracking of liquid-filled, flexible, sealed plastic film containers of the type described can be prevented by producing a continued areal stress in the walls of said containers. The term "areal stress" as herein employed designates the combination of tensile forces acting on the film both laterally and longitudinally as the result of transmission of forces by the contents of the container. The effect is to place the film under tension.

Contrary to what might have been expected, when liquid-filled flexible sealed plastic film containers to which this invention relates are placed under an areal stress, stress-cracking is eliminated. As a result, the liquid-filled packages can be shipped over long distances or handled roughly without impairing their appearance, and without the danger of developing leaks.

Flexible plastic films which have been found to be useful for the purpose of packaging liquids range in thickness from about one to about ten mils, and preferably from about 1 to 5 mils. As stated, these films are preferably laminates in which two or more plastic films of complementary properties provide packaging films having outstanding qualities; thus for example, one lamina may provide strength and impermeability to gases and water, while the other lamina assures impermeability to oils and the like. Such laminates can be obtained by the means known to the art, for example, by extruding one plastic lamina over another lamina, and passing the sandwich between hot rolls to seal them together. The laminates are usefully employed for making packages which are produced and sealed, e.g. heat-sealed, in the usual way, and then the stress-producing means of the process of the invention are applied.

The areal stress sufficient to prevent stress-cracking of the plastic film can be produced by a variety of simple means. Most easily it is applied externally. Alternatively, the materials packaged can be filled under internal pressure, whereby the wall of the package is placed under areal stress. Again alternatively, the stress can be produced simultaneously with production of the package, by ballooning the walls of the container beyond the point required to remove slack as the seal is made. Thus, for example, the packages can be encircled with an elastic band; or can be externally wrapped in whole or part under pressure, as for example, by an external fabric, plastic or paper wrapping or carton applied with pressure. By placing a pillow-shaped package between two flat, relatively inflexible sheets which are held in substantially parallel relationship while exerting pressure on the package as by binding the sheets with two or more encircling bands of filament-reinforced pressure-sensitive adhesive tape, a simple yet effective embodiment of the invention is provided. In another embodiment of the invention, the flexible plastic film containers can be internally pressurized, as by introducing an amount of air or innocuous gas such as a "Freon" or nitrogen under pressure before sealing the filled container. Likewise, a telescoping carton can be used to provide pressure externally, or the containers can be filled with liquid and sealed under pressure. External pressure can be applied to the packages individually, or a number of packages can be treated at the same time, as for example by placing them on a pallet, covering the array with a relatively inflexible sheet and binding the sheet and the pallet together with strapping. Likewise a slack corner or end of the package can be twisted to produce areal stress. Numerous other modifications will readily become apparent to those skilled in the packaging art on reading this disclosure.

The pressure which is employed to place the walls of the containers under areal stress can vary over a rather wide range. The lower limit is that amount which removes all slack from the package and places it under definite tension. This pressure is of the order of about 1 oz./sq. in. measured internally of the package, while the upper limit is imposed by the bursting strength of the package walls or the sealed portions of the container and may be several pounds per square inch.

The following examples will more specifically illustrate the best mode contemplated of practicing the process of the invention and the packages thereby produced. While the invention is described with particular reference to packages made of a film laminate composed of films of polyethylene and polyethylene terephthalate, it is to be understood that other water and/or oil proof laminates and films can be used with comparable results and treatment of such filled containers for shipment and the treated filled containers fall within the scope of the invention.

*Example 1*

Each of four rectangular bags measuring 7" x 10" and composed of a ½ mil polyethylene terephthalate film to which an inner lamina of polyethylene is bonded, the total thickness of the film being 1.5 mils, is filled with one quart of water and the open side is heat-sealed for about 2 seconds at 350° F. The bags are slack-filled so that an air bubble remains within the sealed container. One of the bags is not further treated and is used as the control, while the other three bags are treated as follows: Each bag is placed between two rigid metal plates about 8" x 11", large enough to extend beyond the edges of the bag. The flat sides of the bags are placed against the plates, and glass fiber reinforced pressure-sensitive adhesive tape is wrapped tightly around the plates, thereby creating continuing areal stress on the enclosed plastic bag. The three bags under stress and the control bag are placed in a cardboard box and tested by the use of a Gaynes vibration tester. The Gaynes vibration tester is a standard testing machine which simulates accelerated shipping conditions by subjecting articles to combined horizontal and vertical reciprocatory motion as in A.S.T.M. Procedure D999-48T. The machine has a platform which moves simultaneously one inch in a horizontal direction and one inch in a vertical direction, connected with driving means arranged so that the platform completes one reciprocation for each revolution of the driven shaft. The speed of the shaft can be varied.

In the tests, the bags are initially subjected to vibration at a speed of 175 cycles/min. under the conditions of the standard test so that a draw sheet can be removed from under them slowly without resistance. The bags are removed every ten minutes and inspected for stress cracks and leaks. The control bag, which is not subjected to areal stress, has stress cracks after ten minutes of treatment, and it leaks. The bags which are kept under areal stress do not show any stress cracks after 60 minutes at 175 cycles/min. One hour under the standard test conditions is commonly considered acceptable performance. The speed of the machine is then increased to 225 cycles/min. to determine when failure occurs. One of the three stressed bags fails after 30 minutes; the other two bags fail only after 40 minutes of shaking at 225 cycles/min. This is considerably more than the commonly accepted standard for packages. The stress-crack failure of the packages according to the invention appears only after almost 20,000 cycles as against less than 2000 cycles for the control, a tenfold increase in resistance to stress-cracking.

*Example 2*

Plastic packages suitable for containing liquids, prepared from laminated clear plastic film composed of an inner lamina of polyethylene and an outer 0.5 mil thick lamina of polyethylene terephthalate, the total film thickness being 1.5 mils, are employed in the tests. The containers are of a size suitable for packaging one quart each of liquid, that is, their maximum total capacity is slightly more than one quart to provide for an air space. Each of 4 bags is filled with water, and one of the bags is set aside to serve control. The other bags are placed under areal stress by wrapping a glass fiber reinforced, pressure-sensitive adhesive packaging tape around the middle of each bag, pulling the tape tight so that the bag is squeezed and the air entrapped therein is under a pressure above atmospheric pressure. The control and treated bags are placed in a box mounted on a Gaynes vibration tester and subjected to vibration at a rate of 175 cycles per minute. The bags are inspected at 10 minute intervals and the time of appearance of stress-cracking and leakage is noted. The control container is removed after 30 minutes, having developed leaks; and the speed of the machine is increased to 225 cycles per minute and the test is continued. It is found that the untreated container has numerous cracks after 30 minutes at 175 cycles per minute, and generally presents a wrinkled, untidy appearance, whereas the packages which have been placed under tension fail only after a further 30 minutes at 225 cycles and are substantially less wrinkled. Similar bags containing more viscous liquids require still longer test periods before stress cracks appear.

*Example 3*

Three clear, laminated plastic packages containing a quart of water, prepared as in the previous example using 1.5 mil laminate, are placed in rigid 3.5 inch diameter telescoping cartons of such size that pressure can be applied to the plastic container by squeezing the external carton. The plastic packages are placed under conditions of areal stress by compressing the cartons and fastening them in compressed position. When tested on a Gaynes vibration tester against a similarly packaged but not compressed control bag, the following results are obtained. The control bag shows incipient cracks and is badly wrinkled after 10 minutes at 175 cycles per minute. One of the bags placed under pressure in a telescoping carton fails only after one hour at 175 cycles plus a further 40 minutes at 225 cycles per minute whereas the other two do not fail even after a further 20 minutes at 225 cycles per minute when the test is discontinued.

*Example 4*

Two plastic bags containing a quart of water each, prepared from a 2.5 mil laminate (1.5 mil polyethylene and 1.0 mil polyethylene terephthalate) by the method described in Example 1, are pressurized internally by adding to the ice cold aqueous contents of each bag a quantity of trichlorofluoromethane (about 10 to 20 ml.) sufficient to produce a slight positive internal pressure at normal room temperature. The packages are filled and sealed at a temperature of about 10° C. and allowed to warm up to room temperature so that their walls are under areal stress; they are then placed in a vibration tester of the type described in Example 1, together with an identical unpressurized plastic container merely filled with water according to the usual practice. The containers are tested by subjecting them to reciprocatory motion as set forth hereinabove at 225 cycles per minute, checking at 10 minute intervals for leakage. The results are as follows: The control bag fails after 10 minutes at 225 cycles per minute with numerous cracks and wrinkles. One of the pressurized bags fails after 50 minutes at 225 cycles per minute and the test is then stopped.

*Example 5*

Four clear plastic, laminated containers having an inner polyethylene layer and an outer polyethylene terephthalate layer, and having a total film thickness of 1.5 mils, containing one quart of water packaged in the usual way so as to contain an air bubble, are subjected to areal stressing means as follows: 2 flat rigid wooden bars, each of which is about ½ inch wide and ⅛ inch thick and of a length sufficient to extend beyond the edges of the plastic container when placed in a crosswise position thereon, are positioned on opposite sides of the containers in a transverse position approximately mid-way between the ends of the packages. The two bars are then firmly clamped together by wrapping non-elastic, pressure-sensitive packaging tape around the ends. A sufficient amount of tension is placed on the tape connecting the bars so that the plastic packages are ballooned to produce a substantially smooth surface on the exposed portion of the containers except for the heat-sealed seams. When tested on a vibratory test machine according to the procedure set forth in Example 1, the bags so treated withstand one hour at 175 cycles per minute plus from 30 to 60 minutes of further testing at 225 cycles per minute, while a control bag leaks due to stress cracking within ten minutes at 175 cycles per minute.

The examples hereinabove show the benefits derived by the practice of this invention when packaging a liquid having a rather low viscosity. While water is illustrative of such liquids, aqueous solutions such as volumetric solutions for analysis, isotonic solutions for clinical purposes and other such solutions are found to be advantageously packaged under areal stress as herein set forth either in heat-sealed laminated polyethylene-polyethylene terephthalate or in other heat sealed plastic envelopes possessing satisfactory mechanical strength and chemical resistance. The laminate may, for example, be externally coated to decrease permeability to vapors or air. For the packaging of liquids in heat-sealed envelopes, laminates employing an inner layer of a heat-sealable material such as polyethylene, and, because of its strength, an external layer of polyethylene terephthalate, are found to be outstandingly useful. The following example illustrates the application of the method of this invention to containers of different capacities.

*Example 6*

It is found that as the package is made larger stress-cracking becomes a more serious problem.

Rectangular flat bags of 2.5 mil thick polyethylene-polyethylene terephthalate laminate are prepared in 1 quart and 1 gallon sizes, slack-filled with water and heat-sealed. One container of each size is set aside as a control and another of each size is backed on each surface with a sheet of corrugated cardboard about as large as the bag and manually bound tightly with pressure-sensitive adhesive tape to produce areal stress. The four bags are then tested as above for stress-cracking. The controls fail within 10 minutes, whereas tests on the stressed bags are finally discontinued after 80 and 180 minutes, respectively, the containers still being in good condition.

The times and cycles of test in each case are shown in the following table.

| Capacity | Control (failed) | | Stressed (test stopped) | |
|---|---|---|---|---|
| | time (min.) | cycles | time (min.) | cycles |
| 1 quart | 10 | 2,250 | 180 | 34,500 |
| 1 gallon | 8 | 1,400 | 80 | 14,000 |

*Example 7*

Three 1 quart capacity containers made as in Example 6 are filled respectively with a commercial black enamel, light mineral oil and a 38.7 percent solids butadiene-acrylonitrile latex (available under the trademark name Chemigum Latex 236 from Goodyear Chemical Division) and are then heat-sealed and placed under areal stress as described in Example 6. Two packages of 1 quart capacity containing the light mineral oil and the latex respectively are heat-sealed and used as controls. The five containers are then tested as in Example 6 and it is found that the controls fail after 145 and 10 minutes, about 26,000 and 2300 cycles, respectively. The stressed packages do not fail in 4.5 hours after about 60,000 cycles and the test is discontinued.

The results of this example show particularly the suitability of the method of this invention in the packaging of somewhat viscous materials. The disposal of conventional cans is always a problem because of the bulk whereas flexible plastic containers are free from this disadvantage. Where transparent packages are used there is the further advantage of the visibility of the contents and in the case of paints not only is the actual color visible, but furthermore any separated pigment is readily resuspended by manipulation of the sealed container. By the application of the method of this invention, these advantages of plastic bags can be realized with an assurance that there will be no deterioration or leakage of the containers owing to stress-cracking.

What is claimed is:

1. A method for preventing stress-cracking of liquid-filled, flexible, pliable, plastic film packages, the walls of which are relatively thin and normally slack and unstressed, which comprises continuously applying to the walls of said packages after filling them an amount of pressure external to said packages at least sufficient to place the said walls under superimposed areal stress.

2. A liquid-filled, flexible plastic film package, the walls of which are composed of a relatively thin, normally slack, film laminate consisting of an inner lamina of polyethylene and an outer lamina of polyethylene terephthalate, at least a portion of the walls of said package being joined by means of heat-sealing, and said package in filled condition being subjected to a stress-producing means external to said walls sufficient to remove all slack from the container and to produce tension in said walls less than that required to disrupt the heat-seal.

References Cited in the file of this patent

UNITED STATES PATENTS

| | | |
|---|---|---|
| 2,439,716 | Canfield et al. | Apr. 13, 1948 |
| 2,635,742 | Swartz et al. | Apr. 21, 1953 |
| 2,659,934 | Burgess | Nov. 24, 1953 |
| 2,679,969 | Richter | June 1, 1954 |
| 2,815,896 | Shapero et al. | Dec. 10, 1957 |